A. Stover.
BEST AVAILABLE COPY
Bag Holder.
Add'l Impt. No. 183. A. I. Patented Dec. 29, 1857.
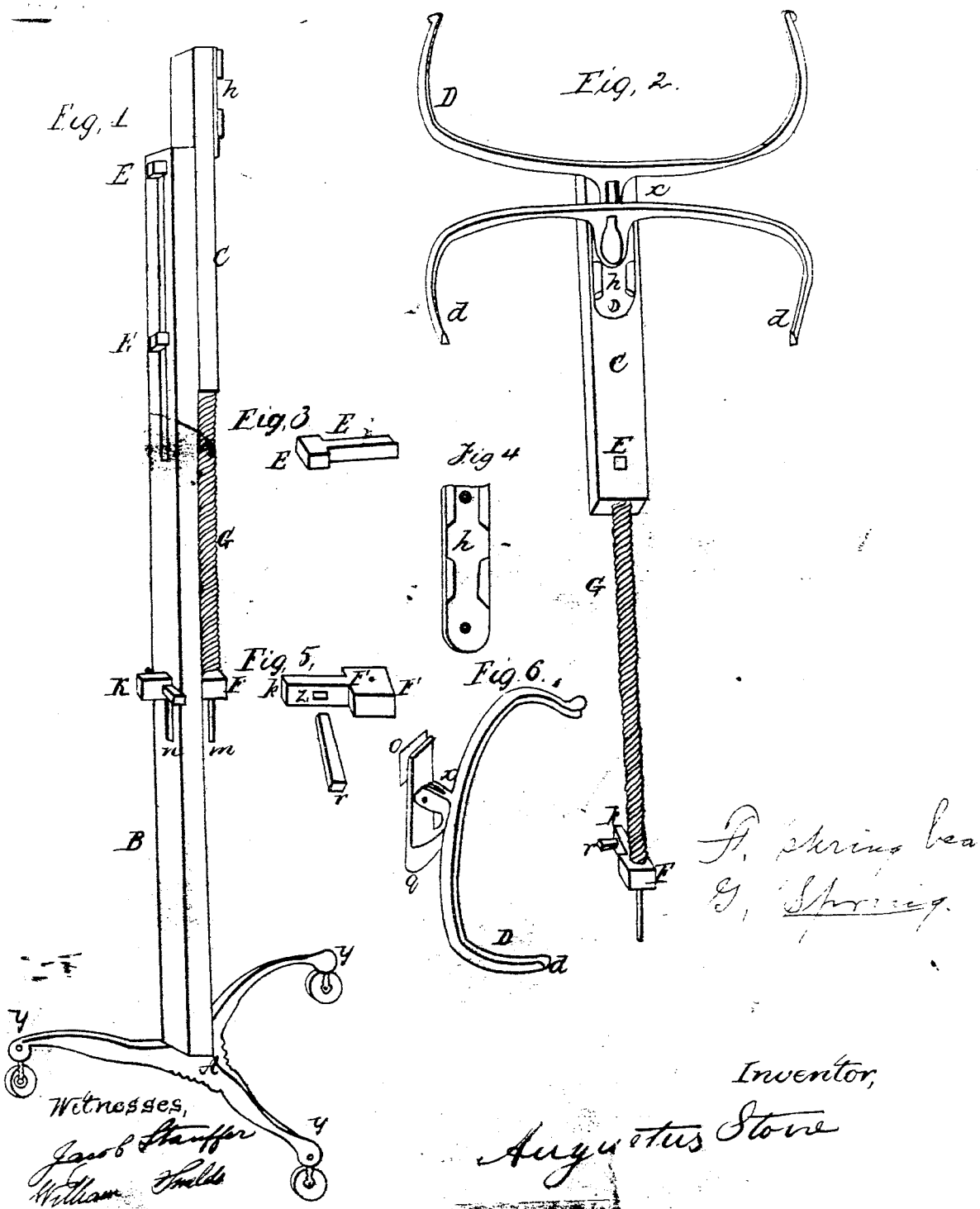
AUGUSTUS STOVER.